United States Patent
Albrecht et al.

[11] Patent Number: 6,160,686
[45] Date of Patent: Dec. 12, 2000

[54] COMPOSITE RAMP STRUCTURE FOR DATA STORAGE DEVICES

[75] Inventors: Thomas R. Albrecht, San Jose; Charles H. Heino, Jr., San Martin; Tsai-Wei Wu, San Jose, all of Calif.

[73] Assignee: International Business Machines Corporation, Armonk, N.Y.

[21] Appl. No.: 09/079,255

[22] Filed: May 14, 1998

[51] Int. Cl.[7] .............................. G11B 5/54; G11B 21/22; G11B 33/14

[52] U.S. Cl. ..................................... 360/255.6; 360/255.7; 360/97.02

[58] Field of Search ................................ 360/105, 97.02, 360/97.03, 255.6–255.9

[56] References Cited

U.S. PATENT DOCUMENTS

| | | | |
|---|---|---|---|
| 4,933,785 | 6/1990 | Morehouse et al. | 360/78.04 |
| 5,034,837 | 7/1991 | Schmitz | 360/105 |
| 5,231,549 | 7/1993 | Morehouse et al. | 360/75 |
| 5,241,438 | 8/1993 | Matsushima | 360/105 |
| 5,289,325 | 2/1994 | Morehouse et al. | 360/105 |
| 5,408,375 | 4/1995 | Asano | 360/105 |
| 5,875,074 | 2/1999 | Ho et al. | 360/105 |

FOREIGN PATENT DOCUMENTS

59-082666  5/1984  Japan.

*Primary Examiner*—William Klimowicz
*Attorney, Agent, or Firm*—Lumen Intellectual Property Services

[57] ABSTRACT

A ramp structure that is designed to reduce the amount of thermal expansion induced misalignment (changes in ramp-disk spacing) between load/unload ramps and data storage disks of a data storage device. The ramp structure has a rigid support structure and ramp units attached to the rigid support structure. The ramp units are made of plastic that is particularly suited for use as load/unload ramps. The ramps are mechanically connected only by means of being attached to the rigid support structure. The data storage disks are attached to a spindle. The rigid support structure is made of a material that has a thermal expansion coefficient that is equal to the thermal expansion coefficient of the spindle and any other parts to which the disks are attached. As a temperature change causes the spindle to expand and the spacing between disks to change, the rigid support structure expands at the same rate, thereby maintaining alignment between the ramps and the disks. Preferably, each ramp unit has two ramps, but each ramp unit can have a single ramp.

15 Claims, 8 Drawing Sheets

COMPOSITE RAMP STRUCTURE FOR DATA STORAGE DEVICES

FIELD OF THE INVENTION

This invention relates generally to computer hard drives and other data storage devices utilizing rotating disks. More particularly, it relates to a load/unload ramp structure for holding the magnetic heads away from the data storage disks when the disks are not spinning.

BACKGROUND OF THE INVENTION

Computer hard drives typically employ a number of rapidly rotating disks having a coating of magnetic data storage material. Each disk is matched with a magnetic read/write head which is held very close to the disk surface. The magnetic read/write head can thereby read and write data on the magnetic disk as it moves.

The magnetic head is prevented from contacting the disk surface by an air cushion of moving air which is moving with the disk. Typically, the magnetic head rests about 0.02 microns above the disk while the disk is moving.

It is very important that the magnetic head and disk surface not come in contact for any extended period of time, since this can result in damage to both the disk surface and the magnetic head. For example, data can be permanently destroyed if excessive contact should occur. In an operating hard drive, contact is prevented by the fact that the disks are rapidly moving.

It is also important for the magnetic head and disk surface not to come in contact when the disks are not rotating (i.e., when the hard drive is not powered). If a disk and magnetic head are at rest and in contact for a period of time, the head and disk surface can stick together, resulting in damage to the disk surface when the disks start to rotate. Also, the disk must start from rest, and a certain minimum velocity is required for the magnetic head to float over the disk surface. Therefore, each startup of the hard drive results in the magnetic head and disk surface rubbing for a distance until the disk achieves sufficient speed to form the air cushion.

For these reasons, load/unload ramp structures have been used in some hard drives to hold the magnetic heads away from the disk surfaces while the hard drive is not operating. The magnetic heads are released from the ramp structure when the disks have achieved the minimum speed for causing the magnetic heads to float above the disk surfaces.

It is noted that some hard drives have disks with nonstick portions that will not cause damage to the magnetic heads even if the heads remain in contact with the nonstick portion for an extended period of time. Such hard drives are known as contact start/stop (CSS) hard drives. CSS hard drives do not utilize load/unload ramp structures.

FIG. 1 shows a typical prior art hard drive with three disks 2. An actuator arm 3 supports a suspension 4, a slider 5 and a lifting feature 6. A magnetic read/write head (not shown) is located on a bottom surface of the slider 5. The actuator arm 3 pivots about a pivot post 9. The lifting feature 6 is positioned on the suspension 4 so that it engages with a ramp 8 on a ramp structure 10. The ramp 8 imparts an upward force on the lifting feature 6 which lifts the slider 5 and magnetic head away from the disk 2. The magnetic head is thereby not in contact with the disk 2 whenever the lifting feature 6 is moved onto the ramp 8.

It is desirable to make the ramp structure 10 from low friction polymer materials. Low friction ramps 8 reduce the amount of energy required to unload the magnetic heads (a concern during unpowered unloading), and also reduce the amount of debris particles generated when the lifting feature rubs over the surface of the ramp. It is also desirable to rigidly fix the location of the ramp structure with respect to the disk surface.

Ramp structures 10 made of polymer materials have thermal expansion coefficients which are often quite different from the thermal expansion coefficients of surrounding metal components which are usually made of aluminum or stainless steel. Therefore, during temperature changes, the plastic ramp structure expands and contracts at a different rate than surrounding components, resulting in misalignment of the ramp structure 10 relative to the disks 2.

Thermal expansion induced misalignment results in decreased usable disk surface area for data storage.

Thermal expansion induced misalignment also necessitates looser alignment tolerances between the ramps 8 and disks 2, which requires that more vertical space be provided between disks. An undesirable consequence of this is that fewer disks fit into a hard drive of a given size.

U.S. Pat. No. 4,933,785 to Morehouse et. al. discloses a ramp structure having a cam structure for holding magnetic heads in an unloaded position. Morehouse does not disclose means for preventing thermal expansion induced misalignment.

U.S. Pat. No. 5,034,837 to Schmitz discloses a ramp structure comprising a single piece of plastic. Schmitz does not disclose means for preventing thermal expansion induced misalignment.

U.S. Pat. No. 5,241,438 to Matsushima discloses a ramp structure comprising a plastic ramp and rigid metal ramp support member for supporting the plastic ramps. Matsushima does not disclose means for preventing thermal expansion induced misalignment.

It would be an advance in the art of hard drive design to provide a ramp structure which provides constant ramp alignment over a wide range of temperatures.

OBJECTS AND ADVANTAGES OF THE INVENTION

Accordingly, it is a primary object of the present invention to provide a ramp structure that:

1) reduces thermal expansion induced misalignment of load/unload ramps;

2) retains the advantages of using ramps made of polymer materials;

3) tightens the mechanical tolerances achievable in ramp-disk alignment;

4) is easily and accurately mounted to the base of a hard drive.

These and other objects and advantages will be apparent upon reading the following description and accompanying drawings.

SUMMARY OF THE INVENTION

The objects and advantages of the invention are attained by a ramp structure for providing load/unload ramps in a data storage device. The data storage device has a disk mounted on a spindle. The ramp structure has a rigid support structure and a ramp unit attached to the rigid support structure. The ramp unit has load/unload ramps. The rigid support structure has a thermal expansion coefficient selected such that a ramp-disk spacing remains constant during changes in temperature.

It is noted that the movement of the disks caused by thermal expansion can also be affected by thermal expansion of a motor, spacer rings between the disks or the disks themselves. The spindle, motor, spacer rings, disks, and any other parts affecting disk movement are considered in sum to be a total drive assembly. Preferably, the rigid support structure has a thermal expansion coefficient selected to match the thermal expansion coefficient of the total drive assembly.

Preferably, the rigid support structure has a thermal expansion coefficient that matches the thermal expansion coefficient of the spindle, disk, and spacer rings. Also preferably, the rigid support structure is made of the same material as the spindle, disk and spacer ring. For example, the rigid support structure can be made of aluminum, steel, stainless steel, ceramic, plastic, glass-filled plastic, and carbon filled plastic.

Preferably, each ramp unit has two load/unload ramps. Alternatively, each ramp unit can have a single ramp.

Preferably, the ramp units are made of a polymer material, e.g. liquid crystalline polymer such as copolyesters of 4-hydroxybenzoic acid and 6-hydroxy-2-naphthoic acid (HAHN), polyacetals, or polyetheretherketone (PEEK). The ramp unit material can have filler materials such as PTFE internal lubricants.

Also preferably, the ramp units and the rigid support structure are mechanically interlocked. In one embodiment, holes in the rigid support structure into which the ramp units extend facilitate interlocking of the ramp units and rigid support structure.

Preferably, the ramp structure is made by molding the ramp units onto the rigid support structure. Molding of the ramp units onto the rigid support structure can be performed by insert molding, for example.

Preferably, each ramp unit comprises a separate piece of material (i.e., the ramp units are not contiguous). This means that the ramp units are mechanically connected only by means of the rigid support structure.

In a particularly preferred embodiment, the rigid support structure has a foot with a step in the bottom surfaces of the foot. The foot extends perpendicularly to the rigid support structure. The step in the foot is designed so that a tilting torque results when the foot is pressed against a flat surface. This enables the ramp structure to be aligned by registration against a sidewall acting as a mechanical fiduciary.

DETAILED DESCRIPTION

Figure 1:
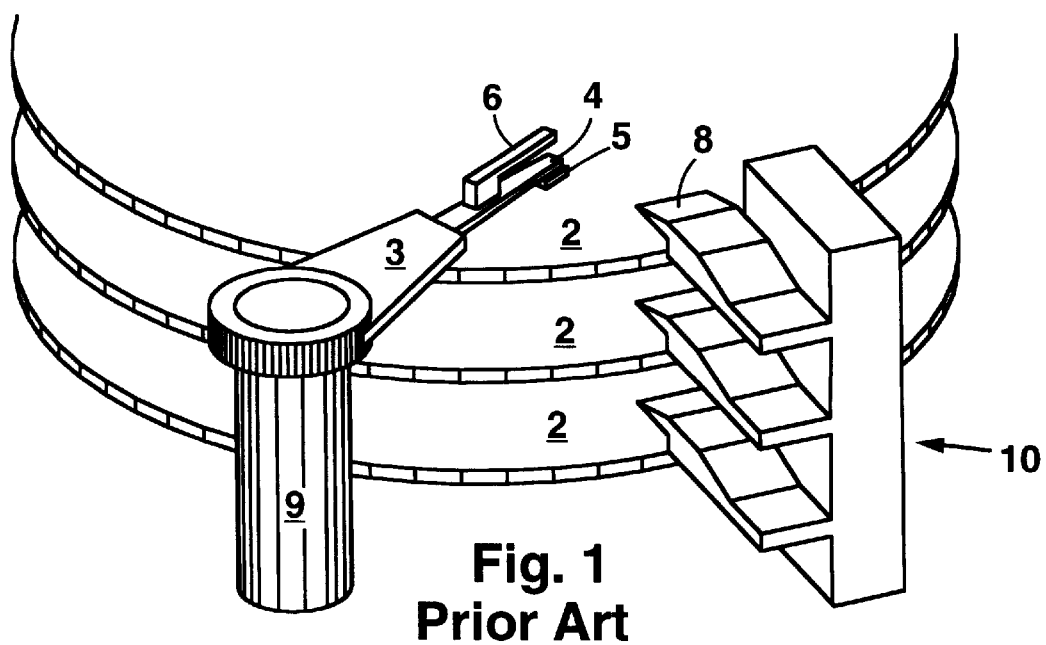
FIG. 1 shows a perspective view of a typical prior art hard drive and load/unload ramp structure.
Figure 2A:
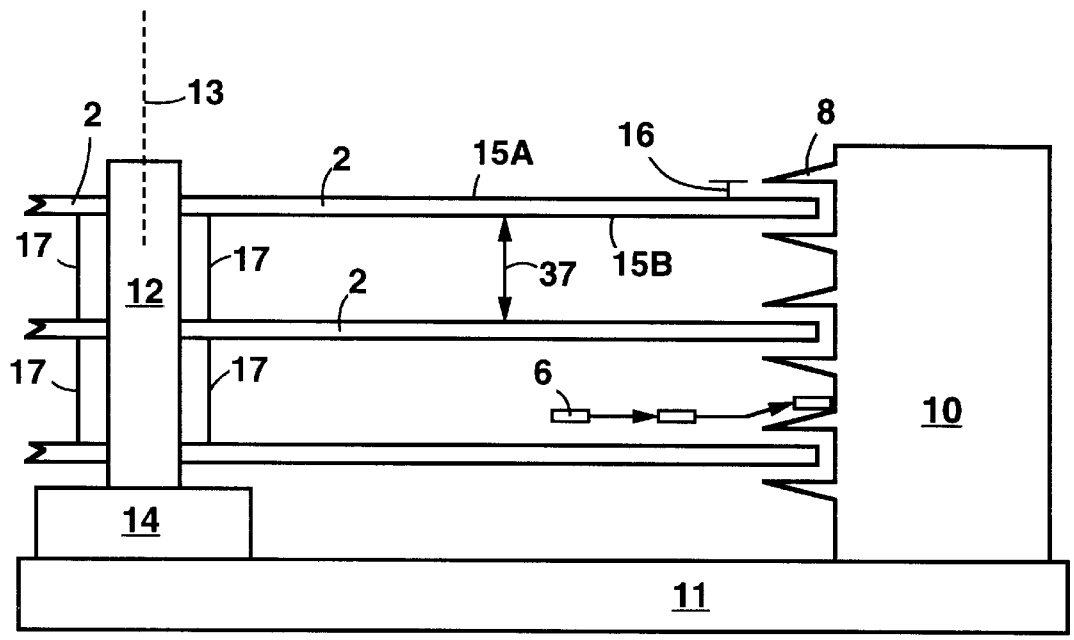
FIG. 2A shows a side view of a typical prior art hard drive and load/unload ramp structure.
Figure 2B:
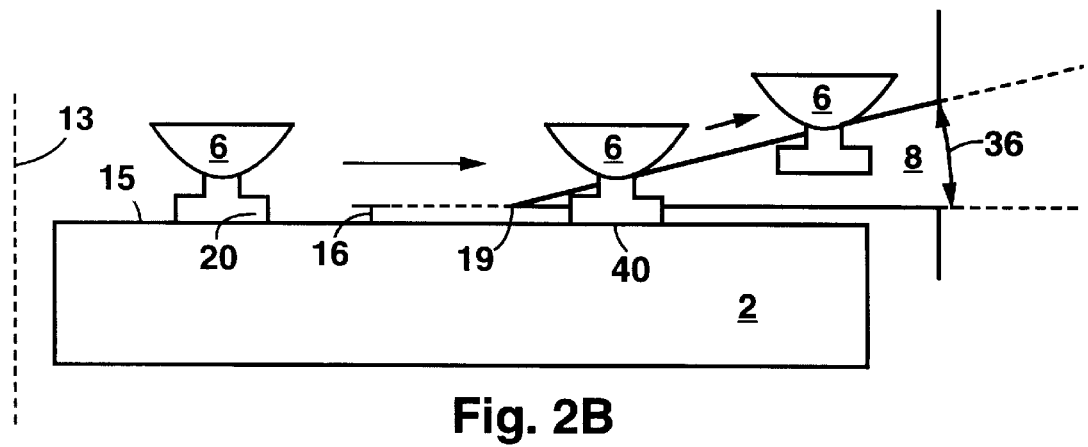
FIG. 2B shows a closeup view of how a load/unload ramp operates.
Figure 2C:
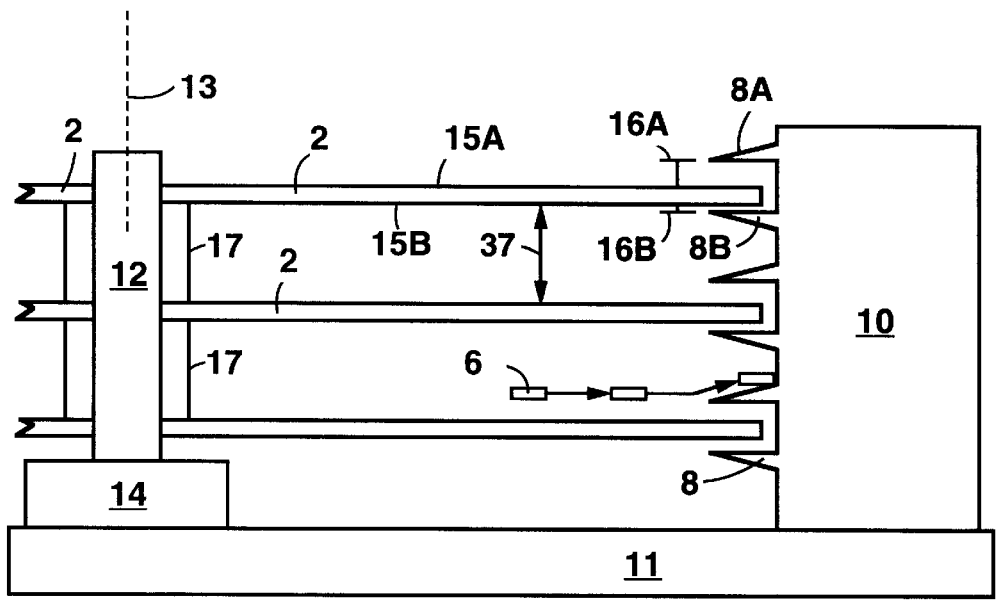
FIG. 2C illustrates thermal expansion induced misalignment problems in a typical prior art load/unload ramp structure.

FIGS. 2A, 2B, and 2C illustrate problems inherent in prior art ramp structures made of polymer materials. FIG. 2A shows a ramp structure 10 attached to a base 11. A spindle 12 having an axis of rotation 13 is connected to a motor 14, and the motor is bonded to the base 11. The motor 14 rotates the spindle 12 about its axis of rotation 13. Data storage disks 2 are mounted on the spindle 12. Each disk 2 has a top disk surface 15A and a bottom disk surface 15B. The ramp structure 10 provides one load/unload ramp 8 for each disk surface 15. Each disk surface 15 and ramp 8 define a ramp-disk spacing 16. Spacer rings 17 are positioned between disks 2 and so help to define a disk spacing 37 between disks 2.

FIG. 2B shows a closeup of the ramp 8 and a lifting feature 6. The lifting feature 6 is designed to be lifted by the ramp 8 when moved in a radial direction away from the spindle 12. A ramp tip 19 is located closer to the disk surface 15 than the lifting feature 6 so that the lifting feature 6 contacts the top surface of the ramp 8. This arrangement must take into account the position uncertainties of the ramp 8 and lifting feature 6. A magnetic head 20 is attached to the lifting feature 6 so that the magnetic head is lifted away from the disk surface 15 when the lifting feature contacts the ramp 8.

The ramp 8 is located above the disk surface 15. The distance between the ramp and the disk surface defines the ramp-disk spacing 16. Ramps 8 typically have a slope 36 of about ¼ or 15 degrees with respect to the disk surface 15. The ramp-disk spacing 16, slope 36, and radial location of the ramp 8 determine a landing radius 40 location. A landing radius 40 is the outermost radius at which the magnetic head 20 and disk surface 15 are close enough to interact. The location of the landing radius determines the outermost radius at which data can be stored. No data can be stored at a radial position outside the landing radius 40.

The location of the landing radius 40 will change when the ramp-disk spacing 16 changes. The landing radius 40 will move towards the spindle axis 13 if the ramp-disk spacing 16 increases, and away from the spindle axis 13 if the ramp-disk spacing 16 decreases. For ramps having a slope of ¼, the radial movement in landing radius location 40 will be four times the change in ramp-disk spacing 16. Changes in the ramp-disk spacing will change the outermost radius at which data can be stored. Data must always be stored closer to the spindle 12 than the minimum possible radius of the landing radius 40. Consequently, large radial uncertainty of the landing radius location 40 reduces the surface area available for storing data. For maximum data capacity and reliable hard drive operation, it is important that the ramp-disk spacing 16 be fixed and well defined. For example, the ramp-disk spacing 16 must not change significantly during changes in temperature.

Temperature change induced variations in ramp-disk spacing 16 require that the disk spacing 37 be larger. This is because the ramp 8 must be large enough to ensure that it intercepts the lifting feature 6. A larger disk spacing 37 results in fewer disks being able to fit into a given volume, and hence, lower data capacity per unit volume.

Table 1 shows thermal expansion coefficients for aluminum and steel, which are commonly used in the spindle 12, motor 14, spacer rings 17 and disks 2 and other components that are mechanically connected to the disks 2.

TABLE 1

| Material | Thermal Expansion Coefficient ($\times 10^{-6}$/degree Celsius) |
| --- | --- |
| Aluminum | 22–23 |
| Glass | 7–7.5 |
| Stainless Steel | 11–12 |

Table 2 shows thermal expansion coefficients for plastics used for ramp structures. Copolyesters of 4-hydroxybenzoic acid and 6-hydroxy-2-naphthoic acid (HAHN) is sold by Hoechst-Celanese, Inc. under the tradename VECTRA A430. HAHN is a liquid crystalline material that has a low coefficient of friction and good wear properties. It is noted that HAHN has a highly anisotropic thermal expansion coefficient and so has two coefficients.

TABLE 2

| Material | Thermal Expansion Coefficient ($\times 10^{-6}$/degree Celsius) |
| --- | --- |
| HAHN | −2 to 5 (Longitudinal) or 65 to 80 (transverse) |
| Polyacetal | 75–85 |
| Polyetheretherketone (PEEK) | 40–50 |
| Polyimide | 31–50 |
| Polyetherimide | 40–50 |

FIG. 2C shows the effect of a temperature increase on a prior art ramp structure. The spindle 12, motor 14, spacer rings 17 and data storage disks 2 are made of metals (or ceramics or glass) and so have a relatively low thermal expansion coefficient. The ramp structure 10 is made of plastic and so has a relatively high or variable thermal expansion coefficient. Consequently, the ramps 8 move upwards relative to the disks 2 during an increase in temperature, and thereby become misaligned. The change in relative height is due mostly to the low expansion of the spindle 12 compared to the high expansion of the ramp structure 10. The change in relative heights is greatest for the disks furthest from the base 11. The ramp-disk spacing 16A between a top load/unload ramp 8A and a top disk surface 15A is increased. The ramp-disk spacing 16B between a bottom load/unload ramp 8B and a bottom disk surface 15B is decreased. This results in the landing radius on the top disk surface 15A moving closer to the spindle 12. The landing radius on the bottom disk surface 15B will move further from the spindle 12. The locations of the landing zones on all the disk surfaces will be moved by the relative change in height between the disk surfaces 15 and load/unload ramps 8.

Figure 3:
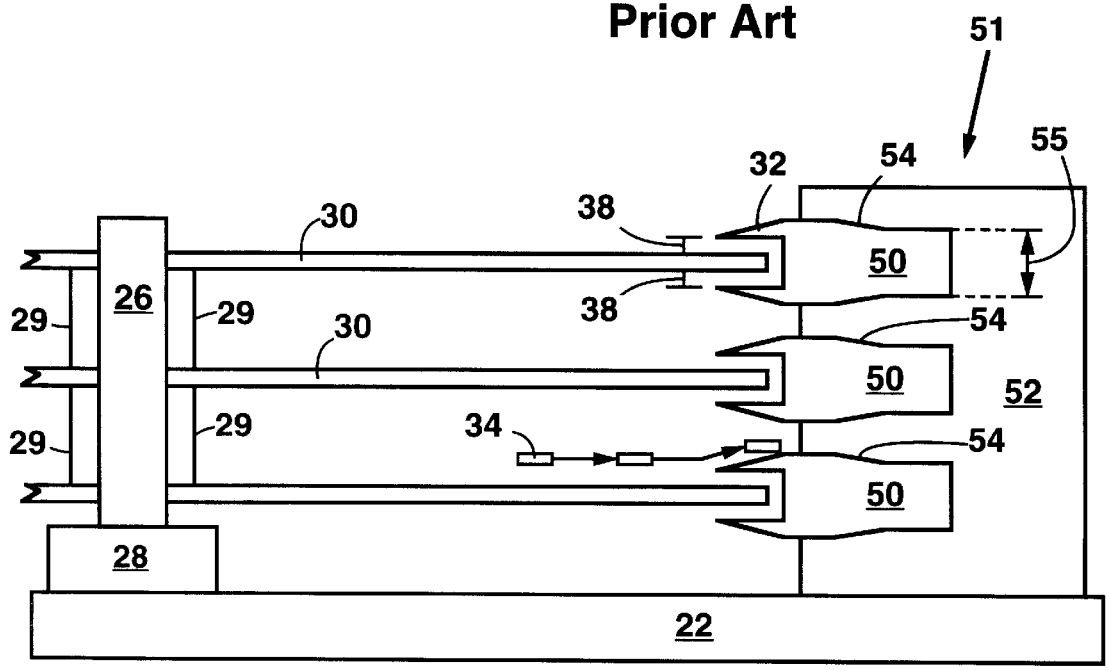
FIG. 3 shows a side view of a hard drive with a ramp structure according to a preferred embodiment of the present invention.

FIG. 3 shows a preferred embodiment of a ramp structure 51 according to the present invention. Ramp units 50, each having a pair of load/unload ramps 32, are attached to a rigid support structure 52 which is mounted to a base 22. The ramp units 50 and the rigid support structure 52 comprise the ramp structure according to the present invention. Preferably, each ramp unit 50 is a separate piece of material (i.e., the ramp units 50 are not contiguous). Also preferably, the ramp units 50 have a minimal vertical extent 55. In one embodiment, the material of the rigid support structure 52 is selected to have a coefficient of thermal expansion which closely matches the coefficient of thermal expansion of a spindle 26. Preferably, the spindle 26, spacer rings 29, disks 30 and rigid support structure 52 are made of the same material. Alternatively, the spindle 26, spacer rings 29, disks 30 and rigid support structure are made of different materials with approximately equal thermal expansion coefficients. Since the ramp units are not connected by plastic material, during temperature changes the ramp units 50 will move with the expansion and contraction of the rigid support structure 52. Also, because the ramp units have a small vertical extent 55, the thermal expansion motion of the ramps 32 is dominated by the thermal expansion motion of the rigid support structure 52.

Since the spindle 26 and the rigid support structure 52 expand and contract at the same rate, the ramp-disk spacing 38 will be substantially constant for all disk surface/ramp pairs over a wide range of temperatures. The ramp-disk spacing 38 will remain constant during temperature changes even for disks far from the base 22.

More generally, the rigid support structure 52 can be made of a material selected to have a coefficient of thermal expansion that results in the ramp-disk spacing 38 being constant during changes in temperature. In most drives this is accomplished by matching the thermal expansion coefficients of the rigid support structure 50 with the spindle 26 (to which the disks 30 are mounted). However, thermal expansion of other parts such as the motor 28, spacer rings 29, and the disks themselves can also influence the displacement of the disks 30 during changes in temperature. Therefore, the thermal expansion coefficient of the rigid support structure 52 may not be exactly equal to the thermal expansion coefficient of the spindle 26. Instead, the thermal expansion coefficient of the rigid support structure 52 can be matched to the thermal expansion coefficient of the combined spindle 26, spacer rings 29, disks 30 and motor 28. The spindle 26, motor 28, spacer rings 29, and disks 30 and related components that affect the thermal expansion movement of the disks 30 can be considered to be part of a total drive assembly. It is noted that the total drive assembly comprises any components that affect the thermal expansion displacement of the disks 30 and hence the ramp-disk spacing 38. A particular data storage device may have components other than the spindle, spacer rings, disk, and motor that affect the thermal expansion displacement of the disks 30.

Disks 30 which are used in hard drives comprise a plate of material (typically aluminum) coated with a thin film of magnetic data storage material. Other coatings may also be used. The thermal expansion coefficient of such a coated disk 30 is almost wholly determined by the material of the plate and not of the coatings disposed on the plate.

It is noted that the thermal expansion change in ramp-disk spacing 38 can also be affected by the base 22 if the base does not have a uniform thickness. For example, if the base 22 is thicker beneath the spindle 26 and motor 28 than beneath the ramp structure 51, then the thermal expansion of the base 22 will have an effect upon the ramp-disk spacing 38.

Data storage devices such as hard drives typically are constructed to operate at temperatures in the range of 0° C. to 70° C. Therefore, the ramp-disk spacing 38 should be relatively constant over this temperature range. A relatively constant ramp-disk spacing over this temperature range can be accomplished by the ramp structure 51 of the present invention.

In a particularly preferred embodiment, the rigid support structure 52 is made of aluminum and the spindle 26 is made of aluminum. Alternatively, the spindle 26 and rigid support structure 52 are made of stainless steel.

In some drives, disks 30 made of glass may be used. Glass has a thermal expansion coefficient that approximately matches that of stainless steel. Therefore, in the case of using glass disks, the spindle 26, spacer rings 29 and rigid support structure 52 may be made of stainless steel.

The spindle 26 and spacer rings 29, however, have by far the greatest effect upon the thermal expansion movement of the disks 30. Therefore, matching the thermal expansion coefficients of the spindle 26, and spacer rings 29 with the thermal expansion coefficient of the rigid support structure 52 will provide substantial reduction of thermal expansion induced changes in ramp-disk spacing 38 compared to conventional ramp structures.

Figure 4:
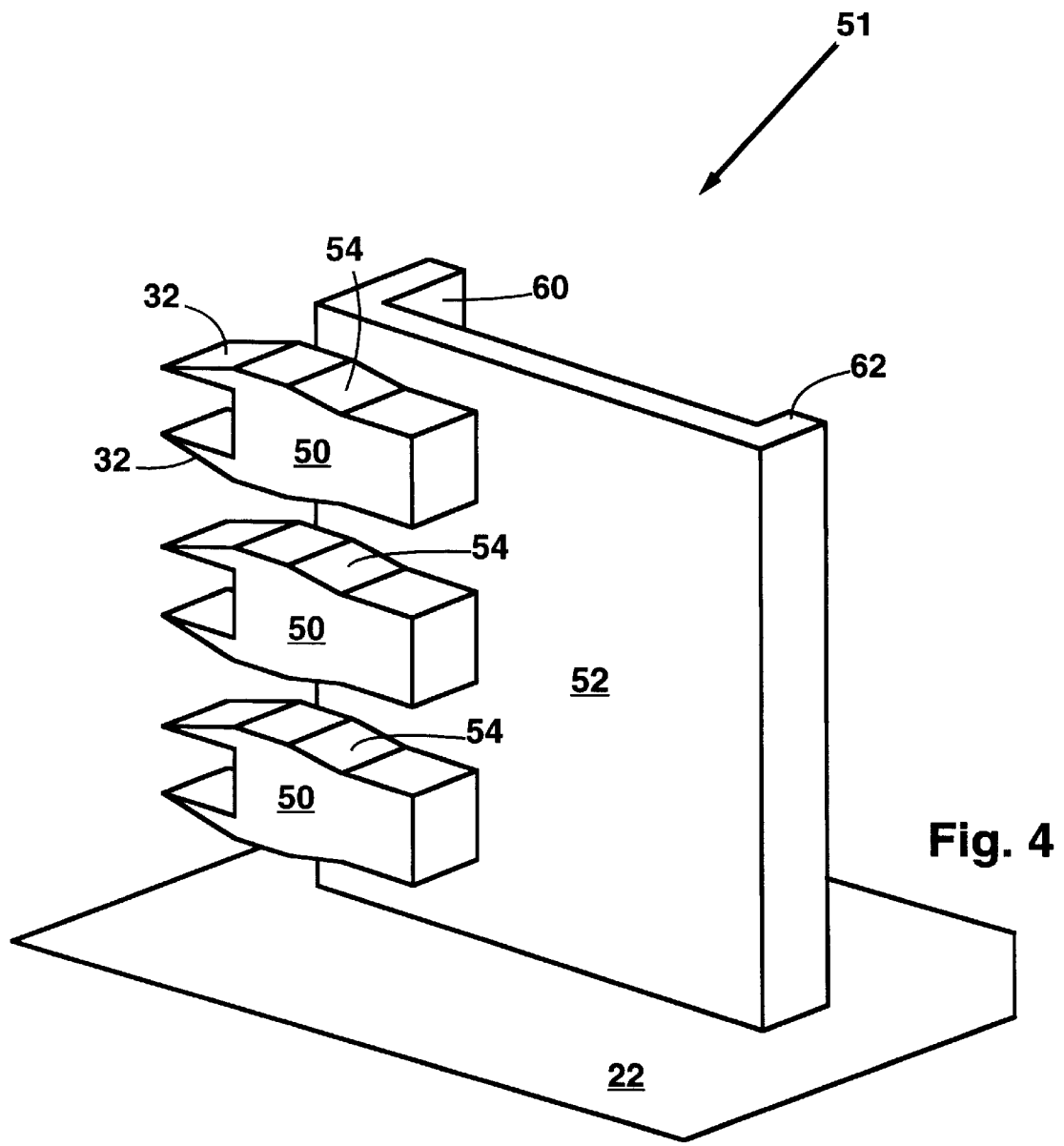
FIG. 4 shows a perspective view of the ramp structure according to the preferred embodiment of the present invention.

FIG. 4 shows a closeup view of the ramp structure of the present invention. Three ramp units 50 are attached to the side of the rigid support structure 52. The ramp structure shown in FIG. 4 has six load/unload ramps 32 (two on each ramp unit 50), and so is appropriate to use in a drive with three disks. However, almost any number of ramp units 50 can be bonded to the rigid support structure 52.

Preferably, the ramp units 50 have parking well surfaces 54 which are sloped such that the lifting feature 34 is held in a parked position. The use of parking well surfaces 54 in ramp structures is known in the art of hard drive construction.

The ramp units 50 are made of a plastic which has a low coefficient of friction and good wear properties (low particulate production). Examples of such materials include liquid crystalline polymers such as copolyesters of 4-hydroxybenzoic acid and 6-hydroxy-2-naphthoic acid (HAHN), polyetheretherketone (PEEK), polyimide, and polyacetals. To reduce friction and wear, PTFE-filled plastics can be used. In a particular preferred embodiment, the ramp units 50 are made of injection molded liquid crystalline polymer such as HAHN, which is sold by Hoechst-Celanese, Inc. under the tradename VECTRA A430.

The rigid support structure 52 preferably has flanges 60, 62 to help increase the rigidity of the rigid support structure 52. High rigidity is beneficial for maintaining accurate positioning of the ramp units 50 with respect to the disks 30.

Figure 5:
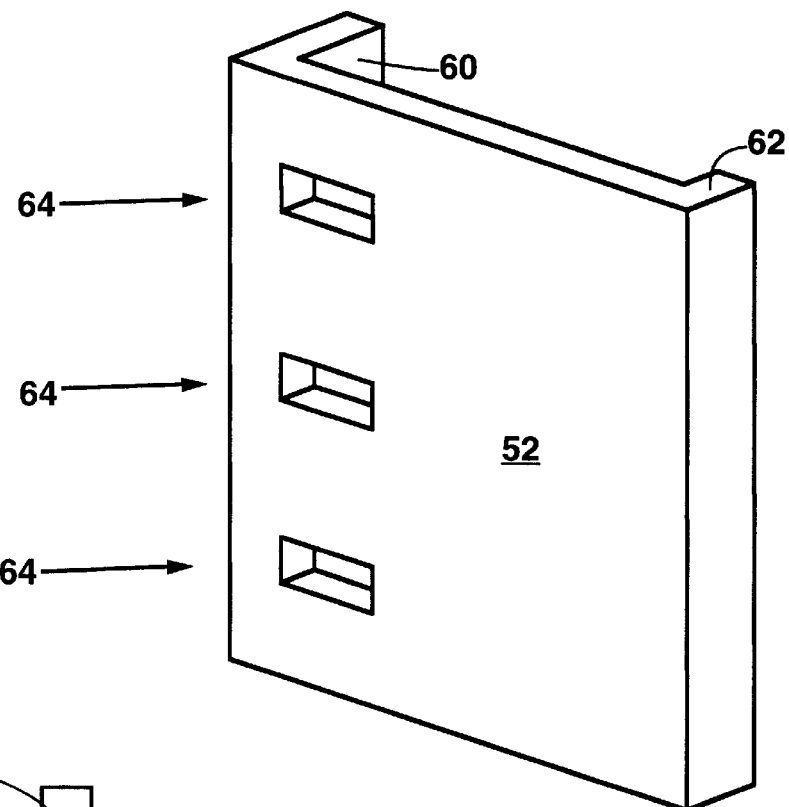
FIG. 5 shows a perspective view of a rigid support structure which is a component of the ramp structure of the present invention.

FIG. 5 shows a preferred embodiment of the rigid support structure 52. The rigid support structure 52 preferably has holes 64 with which the ramp units 50 mechanically interlock.

Figure 6A:
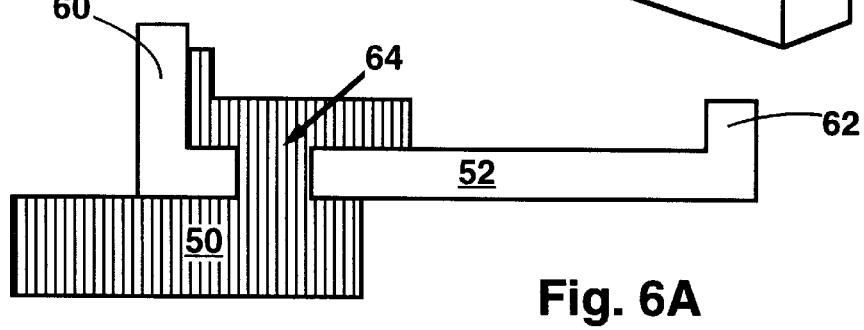
FIGS. 6A, 6B show cross sectional views of the ramp structure illustrating how the rigid support structure and ramp units are attached in the preferred embodiment.

FIG. 6A shows a cross sectional view of the rigid support structure 52 and ramp unit 50. The ramp unit extends through the hole 64 and so mechanically interlocks with the rigid support structure 52. This is the preferred means of attaching the ramp units to the rigid support structure 52.

Figure 6B:
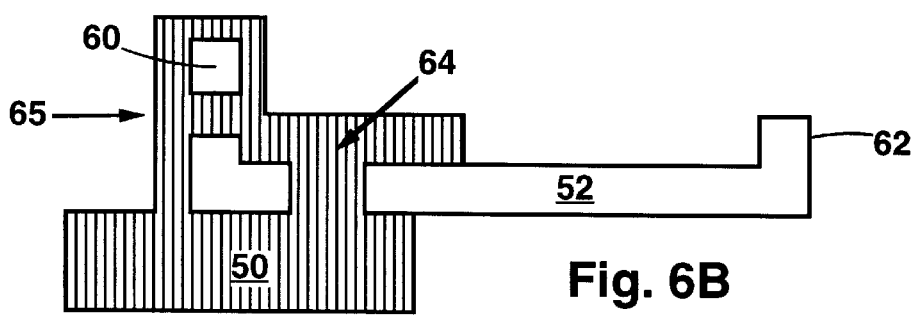

Alternatively, as in FIG. 6B, the ramp unit 50 can wrap around the flange 60 to provide added mechanical stability. It is noted that more than one hole 64 can be provided for each ramp unit 50. For example, each ramp unit 50 can also be mechanically interlocked with a second hole 65 in the flange 60.

Otherwise, the ramp units 50 can be attached to the rigid support structure 52 with screws. This is not preferred as screws can cause plastic deformation of the ramp units 50 and eventual misalignment.

Another alternative is to attach the ramp units 50 by snap-fit structures which snap into the holes 64, 65. Yet another alternative is to attach the ramp units to the rigid support structure 52 by means of a heat staking process.

Figures 7, 8:
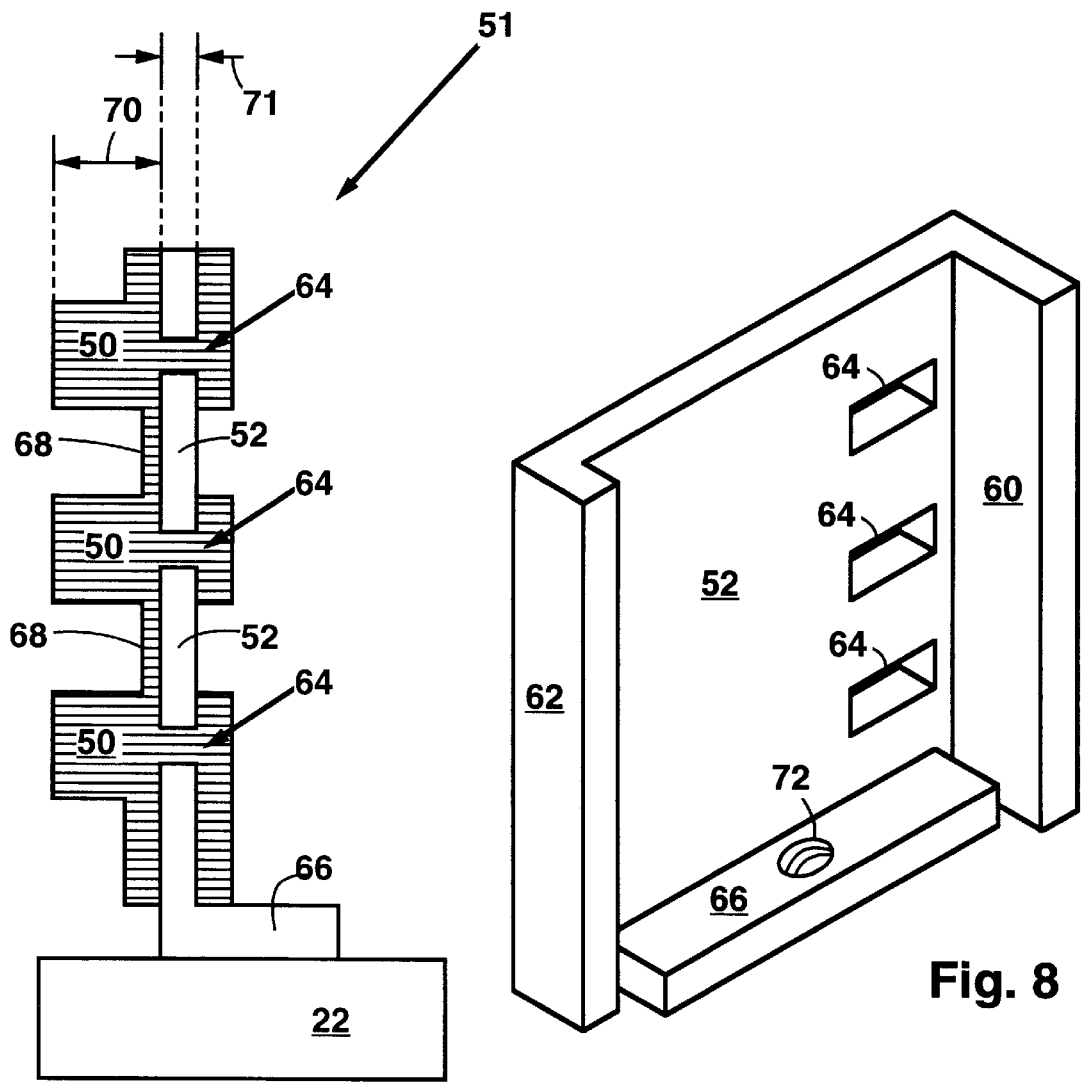
FIG. 7 shows a vertical cross sectional view of the ramp structure.
FIG. 8 shows a perspective view of the back side of the rigid support structure.

FIG. 7 shows a cross sectional view of the ramp structure in which the cross section cuts vertically through the ramp units 50 and holes 64. Preferably, the rigid support structure 52 has a foot 66 to facilitate mounting the ramp structure to the base 22. The foot 66 extends perpendicularly to the rigid support structure 52. A thin layer 68 of plastic ramp unit material may be present between the ramp units 50. The thin layer 68 should be thin compared to a thickness 70 of the ramp units 50 and a thickness 71 of the rigid support structure 52. Restricting the layer 68 to be thin renders the ramp units 50 mechanically connected predominantly by means of the rigid support structure 52. Consequently, the ramp units 50 move during changes in temperature according to the thermal expansion coefficient of the rigid support structure 52.

FIG. 8 shows a back view of the rigid support structure 52 according to the preferred embodiment of the present invention. The foot 66 can be clearly seen. Preferably, the foot 66 has a threaded hole 72 for accepting a screw or bolt.

The ramp structure according to the present invention can be made by stamping and forming the rigid support structure 52. In a typical embodiment, the rigid support structure is about 15 mm tall and 0.8 mm thick. The rigid support structure is placed inside an injection molding machine and the plastic ramp unit material is flowed around the rigid support structure. The ramp unit material is flowed through the holes 64, 65 to provide mechanical interlocking of the rigid support structure and ramp units. Placing a part such as the rigid support structure inside an injection mold is well known in the art of injection molding as 'insert molding'. Insert molding can form ramp units 50 having accurate dimensions and dimensional stability.

Alternatively, the rigid support structure can be made by diecasting, extruding, molding or machining. The rigid support structure can also be made of plastics or ceramic materials, provided that the rigid support structure has an appropriate thermal expansion coefficient. In the case where the rigid support structure is made of plastic material, the plastic material composition can be adjusted to provide the rigid support structure with a predetermined thermal expansion coefficient. For example, glass-filled plastics and carbon-filled plastics can be used.

Although the rigid support structure has been shown to have a flat, planar shape, it is possible to use a rigid support structure with other shapes. For example, rigid support structures with block shapes or cylinder shapes can be used.

Figure 9:
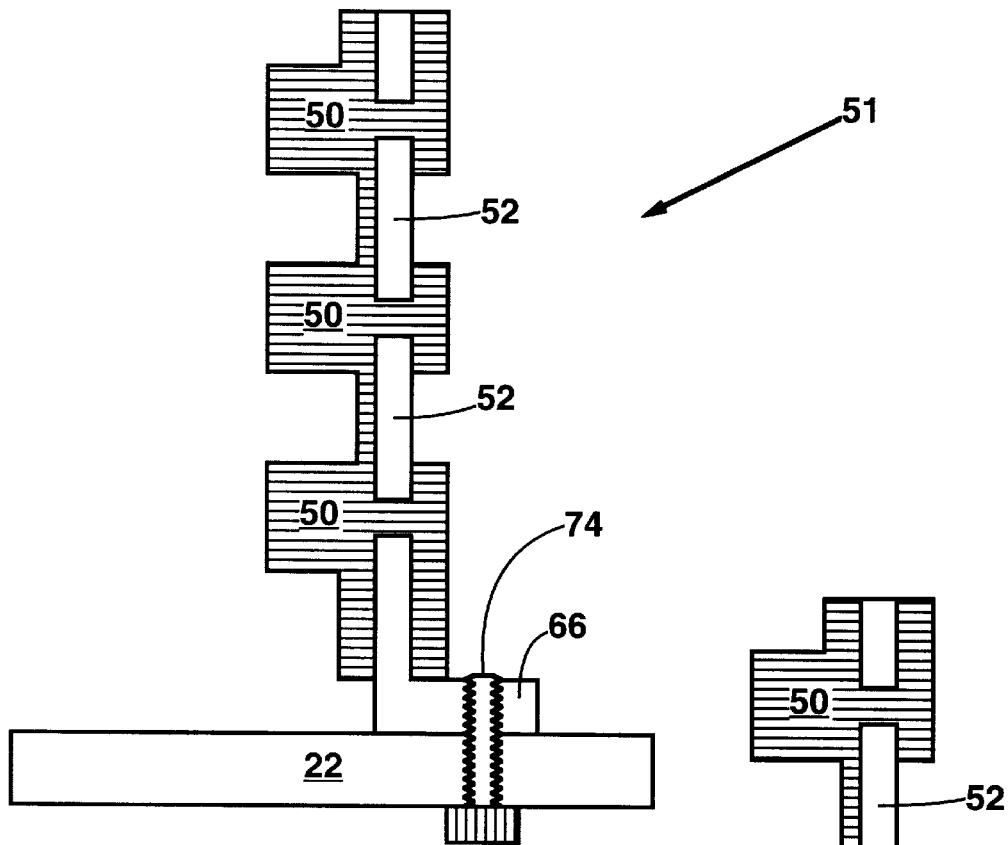
FIG. 9 shows a side view of the ramp structure according to the present invention and how the ramp structure is preferably mounted to a base.

FIG. 9 shows a cross sectional side view of the ramp structure of the present invention attached to the base 22 with a screw 74.

Figure 10:
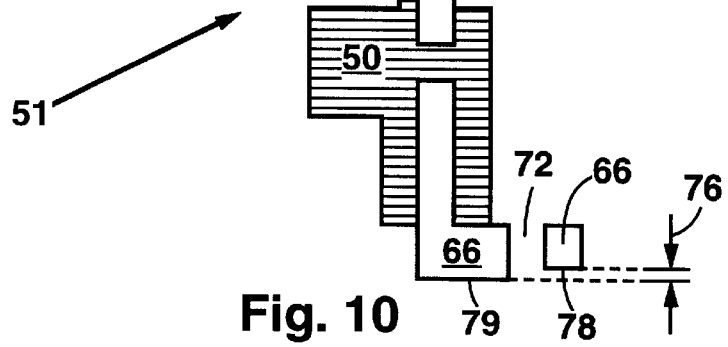
FIG. 10 shows a reverse perspective view of the rigid support structure according to a preferred embodiment.

FIG. 10 shows the preferred embodiment of the present invention in which the foot 66 has a step 76 on the bottom. Preferably, the step 76 intersects the threaded hole 72 as shown. An outer bottom surface 78 of the foot is raised compared to an inner bottom surface 79 of the foot 66.

Figure 11:
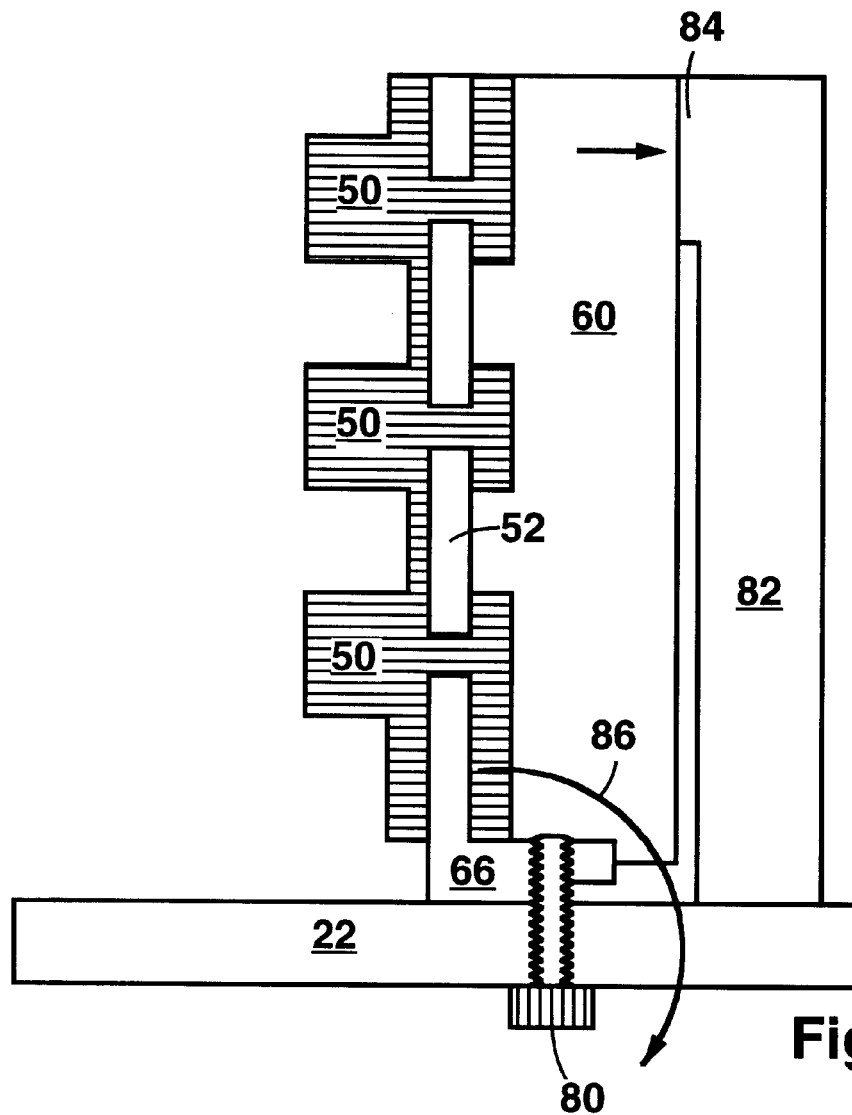
FIG. 11 shows a vertical cross sectional view of the ramp structure bolted to a base. The ramp structure has a foot with a step to cause a clockwise tilting torque.

The step 76 shown in FIG. 10 serves to simplify the task of mounting and positioning the ramp structure to the base. FIG. 11 shows a preferred method of mounting and aligning the ramp structure. A screw 80 attaches to the foot 66 through the base 22. A sidewall 82 is positioned adjacent to the ramp structure. The sidewall 82 has a raised portion 84 which is positioned to contact the flange 60. When the screw 80 is tightened, the step 76 in the bottom of the foot 66 is pressed against the base 22. This pressing action causes a tilting torque 86 about the point of screw-foot contact. The tilting torque 86 acts in a clockwise direction in the view of FIG. 11. The tilting torque causes the flange 60 and raised sidewall portion 84 to be pressed together. This pressing together of the raised portion 84 and flange 60 results in accurate positioning of the ramp structure. The raised portion 84 acts as an alignment fiduciary and so provides accurate registration of the rigid support structure 52. Alternatively, the flange 60 has a raised portion and the sidewall 82 is flat.

Figure 12:
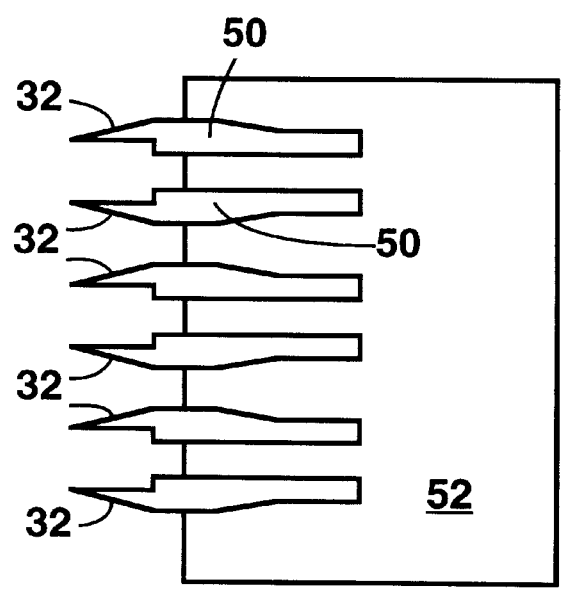
FIG. 12 shows an alternative embodiment in which each ramp unit has a single ramp.

FIG. 12 shows an embodiment in which each ramp unit 50 has a single ramp 32. In this case, each ramp unit 50 having a single ramp 32 is individually attached to the rigid support structure 52. Attaching each ramp individually to the rigid support structure 52 will further reduce the thermal expansion induced changes in ramp-disk spacing 38.

However, this embodiment is not preferred because individually attaching the ramps renders the ramp structure more costly to manufacture.

Although the present invention has been illustrated with three ramp units and six ramps, it is appreciated that almost any number of ramp units or ramps can be attached to the rigid support structure.

It will be clear to one skilled in the art that the above embodiment may be altered in many ways without departing from the scope of the invention. Accordingly, the scope of the invention should be determined by the following claims and their legal equivalents.

What is claimed is:

1. A data storage device comprising:
   a) a total drive assembly comprising:
      1) a spindle having a thermal expansion coefficient,
      2) a motor for rotating the spindle,
      3) a data storage disk attached to the spindle;
   b) at least one ramp unit having a load/unload ramp, the load/unload ramp and the data storage disk defining a ramp-disk spacing therebetween, wherein the ramp unit has a thermal expansion coefficient;
   c) a rigid support structure to which the ramp units are attached, wherein the rigid support structure has a thermal expansion coefficient equal to the spindle thermal expansion coefficient to within $19 \times 10^{-6}$ per degree Celsius.

2. The data storage device of claim 1 wherein the rigid support structure has a thermal expansion coefficient equal to the spindle thermal expansion coefficient to within $8 \times 10^{-6}$/degree Celsius.

3. The data storage device of claim 1 wherein the total drive assembly has a thermal expansion coefficient, and wherein the rigid support structure has a thermal expansion coefficient equal to the total drive assembly thermal expansion coefficient to within $19 \times 10^{-6}$/degree Celsius.

4. The data storage device of claim 1 wherein the rigid support structure and the spindle are made of the same material.

5. The data storage device of claim 1 wherein the rigid support structure and the disk are made of the same material.

6. The data storage device of claim 1 wherein the data storage device further comprises a spacer ring and wherein the rigid support structure and the spacer ring are made of the same material.

7. The data storage device of claim 1 wherein the rigid support structure has a thermal expansion coefficient equal to the spindle thermal expansion coefficient to within $8 \times 10^{-6}$/degree Celsius.

8. The data storage device of claim 1 wherein the ramp units are made of a material selected from the group consisting of polyimide, polyacetals, PEEK, HAHN, liquid crystalline polymers, and PTFE-filled plastics.

9. The data storage device of claim 1 wherein the rigid support structure is made of a material selected from the group consisting of aluminum, steel, stainless steel, ceramic, plastic, glass-filled plastic, and carbon-filled plastic.

10. The data storage device of claim 1 wherein the ramp units and the rigid support structure are mechanically interlocked.

11. The data storage device of claim 10 wherein the ramp units and rigid support structure are mechanically interlocked by holes in the rigid support structure with the ramp units extending into the holes.

12. The data storage device of claim 1 wherein the ramp units are injection molded ramp units.

13. The data storage device of claim 1 wherein each ramp unit comprises a separate piece of material.

14. The data storage device of claim 1 wherein the rigid support structure further comprises a foot for mounting to a flat surface.

15. The data storage device of claim 14 wherein the foot comprises a step such that a tilting torque is exerted on the rigid support structure when the foot is pressed against the flat surface.

* * * * *